April 22, 1958     G. H. PERRY     2,831,465
PILOT VALVE
Filed March 2, 1955

United States Patent Office 2,831,465
Patented Apr. 22, 1958

2,831,465

PILOT VALVE

Gardner Haner Perry, Woodbury, Conn., assignor to The Bristol Company, Waterbury, Conn., a corporation of Connecticut Application March 2, 1955, Serial No. 491,565

9 Claims. (Cl. 121—46.5)

This invention relates to pilot valves for fluid-actuated control apparatus, and more especially to those types of valves suitable for use in pneumatic control devices.

In such valves a seating member subject to actuation by variations in fluid pressure on a piston cooperates with a seat to provide a variable closure in a conduit admitting compressed air or equivalent pressure fluid to a pneumatic motor-operated control apparatus. The fluid pressure is regulated by means of supply-and-waste means wherein the admission of air is limited by passage through a fixed restriction in the supply, and the escape is controlled by means of a baffle or "flapper" more or less juxtaposed to a small escape orifice communicating with the atmosphere.

It is generally characteristic of such pilot valves, that during the time the baffle is in a position where it does not obstruct the escape of air from the orifice, the flow of air, restricted only by the capillary tube or corresponding construction, goes on continuously, and while the discharge rate is relatively low, the fact that this flow continues for extended periods of time means that the total volume of air wasted to the atmosphere is not an inconsiderable amount.

An object of this invention is to provide such a device in which the escape orifice will be sealed and no air will be exhausted from the system when the actuating baffle is not immediately juxtaposed to the valve during periods of inactivity.

Another object of this invention is to provide an improved pilot valve wherein efficient operation is not critical to the dimensions of orifices or other passages restricting the flow of the operating medium.

A further object is to provide a pilot valve having a more positive and rapid action than that heretofore characterizing such devices.

A still further object is to provide a pilot valve wherein constricted passages most susceptible to clogging with dirt or other foreign matter shall be inherently self-cleaning.

In carrying out the purpose of the invention there is provided an auxiliary valve element normally held closed by air pressure and adapted for mechanical actuation by the baffle or tappet which commands the action of the pilot valve. By this expedient the escape of air to the atmosphere through the controlling orifice is limited to those intervals when the baffle is between its extreme positions corresponding respectively to the open, and the closed, positions of the pilot valve. Since such devices are intended only for on and off operations, and not to stand at any intermediate position, it will be appreciated that the time during which air may escape from the orifice will be greatly reduced, and the corresponding wastage rendered of negligible magnitude.

Further objects as well as advantages of this invention will be apparent from the following description and the accompanying drawings in which—

Figure 1:
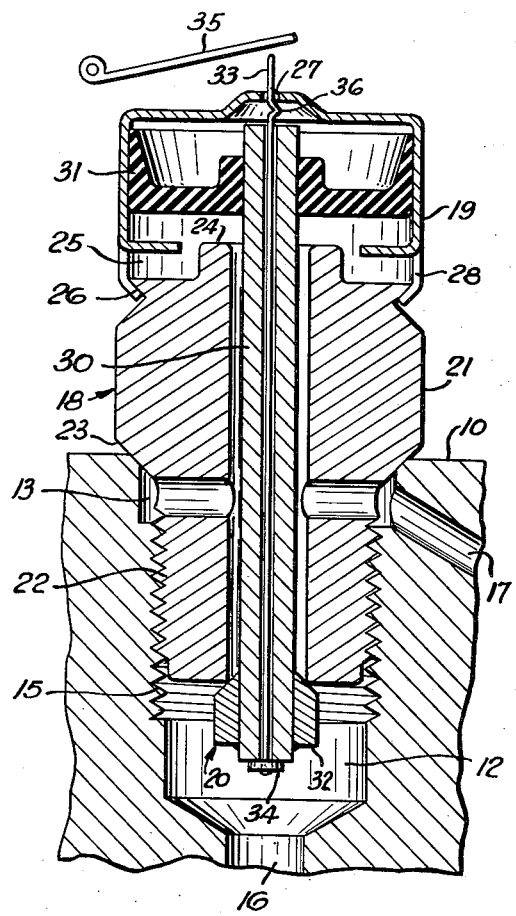
Figures 1 and 2 are sectional views of a pilot valve incorporating the principles of the invention and respectively showing the same in its two characteristic operating positions.

Referring, now, to the drawings, the numeral 10 designates a portion of a controller component commonly known as an "air-block," formed usually of metal, and having therein one or more substantially cylindrical openings, each providing a receptacle for one of the pilot valves to which the present invention is directed. Each of the openings in the air-block 10 comprises an inner cavity 12 and an outer counterbored portion 13 coaxial with said cavity and axially separated therefrom by a section 15 having formed therein a female thread. The inner cavity 12 communicates with an air supply conduit 16 connected to a source of air under pressure, and the outer portion 13 with a conduit 17 providing communication to the diaphragm motor or corresponding actuating element of a control device be operated through the functioning of the pilot valve and not shown in the drawings. The outer edge of the counterbored portion 13 where the opening intersects the surface of the air-block 10 is machined to a smooth surface, either forming a right angle, or slightly chamfered for sealing engagement with a further element now to be described.

The valve proper, to which the present invention is specifically applicable, comprises three essential components, a body member 18, a cap or cylinder 19, and a movable seating member 20. The body member 18 may expediently be machined from hexagonal metal bar stock, leaving an upper, or outer, portion 21 having the original section, and formed with a threaded lower, or inner, portion 22 adapted to cooperate with the threaded section 15 in the air-block 10 in securing said body member within said air-block.

Between the portions 21 and 22 of the member 18 is formed a conically tapered transition section 23 adapted, as the member 18 is screwed into the block 10, to engage the edge of the counterbore 13 in sealing relationship, thereby preventing communication between said counterbore and the surrounding atmosphere.

The member 18 is axially bored through to a diameter of the order of one-third that of the threaded part 22, and both extremities of the bore where it intersects the flat terminal surfaces are suitably finished for sealing relationship with the movable seating member 20 presently to be described.

The upper extremity of the threaded part 22 is transversely drilled through, whereby to provide free communication between the interior bore of the member 18 and the counterbore 13 when said member is screwed into its place in the air-block 10. The upper extremity of the member 18 is formed with an annular central ridge portion 24 having its upper part finished to a seating surface, and being encircled by a rabbet 25; and between the base of said rabbet and the normal hexagonal section of the part 21 is formed an annular groove 26 surrounding the body portion 18.

The cap or cylinder member 19 is spun, stamped or otherwise formed from sheet metal, and comprises a short cylindrical section of internal diameter slightly less than the minimum diameter of the hexagonal portion 21, substantially closed at its upper extremity by a domed portion having a centrally located small opening 27 providing communication between the interior of the cylinder and the surrounding atmosphere. The lower portion of the member 19 is extended in the form of a skirting having formed therein a number of axially extending slits, whereby to permit the bending inward of a plurality of intermediate tongue portions 28, which in assembly engage the annular groove 26 and definitely position the member 19 with respect to the body portion 18.

The movable seating member 20 is comprised of three parts, an extended tubular stem portion 30, a piston element 31 carried on one extremity of said stem portion, and a plug element 32 carried near the other extremity thereof, said three parts being integrated into a unitary assembly. The stem portion 30 is comprised of a straight section of metal tubing having a relatively small smooth bore. The piston element 31 is formed of slightly resilient material, such as rubber of a firm texture, having an external diameter to provide a running fit within the cylindrical portion of the member 19 and an extended length to permit limited displacement therein in an axial sense. Said piston element is sealed, moulded, or otherwise permanently attached to one extremity of the tubular stem portion 30. The plug element 32 is formed preferably of metal, and is provided with a conical seating surface adapted to engage the lower end of the bore through the member 18 in sealing relationship, and is bored through the diameter of the outside of the tubular stem 30, and in assembly, secured thereto as by soldering.

Longitudinally extending through the tubular stem 30 is a stiff wire member 33 of a size sufficiently smaller than the interior of said tube to have a running fit therein and to provide a restricted passage for the flow of air therethrough. To the lower, or inner, extremity of the wire member 33 is secured a small valve member 34, formed of rubber or equivalent resilient material and adapted to seat upon the juxtaposed lower extremity of the tubular stem 30 in sealing relationship to interrupt communication between the cavity 12 and the interior of said stem. The upper, or outer, extremity of the wire 33 is extended to project through the opening 27 in the top of the cap 19, whereby it may be operatively engaged by a movable baffle 35. In order to prevent the member 33 and its attached valve from becoming axially displaced to an inoperative position the former may be provided with a kinked portion 36 adapted to engage the upper end of the tube 30 when the member 33 is in its lowest position and to act as a stop against further downward displacement.

Figure 2:
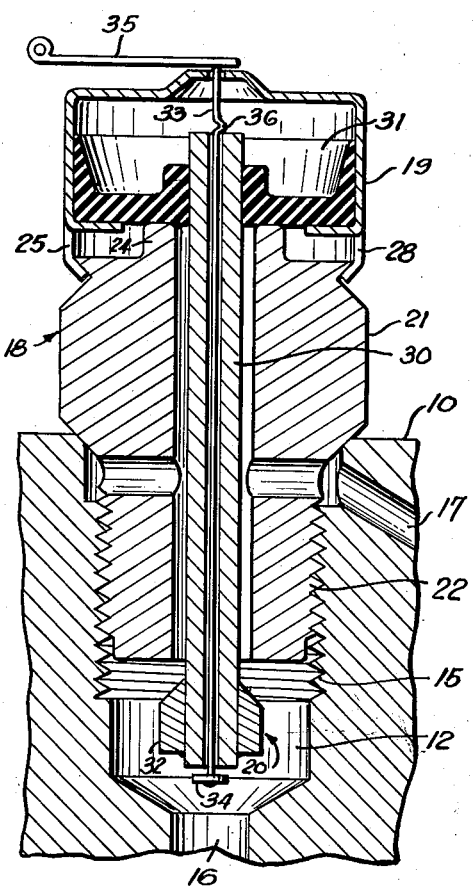

The sectional view in Figure 2 shows the pilot valve with the movable members in the position they might be expected to assume under the influence of gravity alone, when installed in a vertical position with the opening 27 at its uppermost extremity. With the movable member 20 in its lowest position, the piston 31 will rest upon the upper seating surface of the annular ridge 24, while the plug member 20 will occupy a position below that of engagement with the lower surface of said body member, thus leaving around said plug member an annular space whereby the cavity 12 will be in free communication with the interior of said body member, and, through the transverse openings therein, also with the counterbore 13 and with such pressure responsive apparatus as may be connected to the outlet conduit 17. The stem 33 with its attached valve member will also lie in the lowest possible position as determined by engagement of the kink 36 with the upper end of the tube 30, so that the valve 34 will be unseated and the interior of the cylinder 19 placed in communication with the cavity 12 through the annular space between the member 33 and the inner wall of the tubular member 30.

Upon application of air pressure from the supply source to the cavity 12 there will be a free flow of air from said source through conduit 17, and operating pressure will be applied to said responsive apparatus to actuate the same. At the same time a restricted flow of air will take place from the cavity 12, through the annular space surrounding the wire 33, to the space within the cylinder 19 and above the piston 31. With the baffle 35 in the position shown (Figure 2) substantially obstructing the opening 27 and also due to the member 33 holding the attached valve 34 in its open position, a pressure will build up in the space above the piston tending to maintain the same in its lowest position, sealing communication between the interior bore of the body 18 and the atmosphere, and causing pressure to be maintained upon the controlled apparatus.

Upon displacement of the baffle 35 away from its position of close juxtaposition to the opening 27 and from positive engagement with the upper extremity of the wire 33, as indicated in Figure 1, air will escape around said wire through the opening, and the pressure above the piston will tend to become reduced. At the same time the flow of air from the cavity 12 into the tube 30 around the valve member 34, will carry the latter to a seating position on the juxtaposed lower surface of the tubular member, sealing off communication between the interior of the same and the cavity 12, and allowing the pressure above the piston to fall quickly to substantially atmospheric value. The pressure within the longitudinal interior bore of the body 18, acting upon the lower face of the piston 31, will lift the same sufficiently to unseat it from the top of said body permitting a flow of air from said bore to the atmosphere. The momentarily accelerated flow of air both under the piston 31 and around the plug member 32 will intensify the action of the moving part 20, so that it will move abruptly to the upper extremity of its travel, causing the plug member 32 to seat upon the lower face of the body 18, sealing the bore of said body from the supply pressure in the cavity 12, and the pressure within the body and in all communicating spaces, including the counterbore 13, the conduit 17, and any controlled device connected thereto, to fall to substantially atmospheric value.

Upon the baffle 35 being restored to the position shown in Figure 2, its action will be twofold. By mechanical pressure upon the projecting upper extremity of the wire member 33, it will cause the valve member 34 to become unseated from the base of the tubular member 30, admitting air from the cavity 12 through said tubular member, to the space above the piston 31. At the same time, the baffle 35, obstructing and substantially closing the opening 27, will prevent escape of air therefrom so that pressure will build up above the piston forcing the member 20 downward against the upward force on the plug 32 and causing the elements of the valve again to assume the operating positions indicated in Figure 2.

Since the operation of pilot valves of the prior art is dependent upon the relative rates of flow of air through the constricted space in the stem and through the escape orifice, it follows that the relative dimensions of these openings are critical in their nature, and since for economic reasons it is essential in these forms that the continuous wastage of air be limited by making the hollow stem of capillary dimensions, it follows that the design and manufacture of the devices demand exceedingly close tolerances, great precision in machining and fabrication, and correspondingly high production costs. It will be seen that the form embodying the invention no longer requires such microscopic dimensions or close tolerances, and that parts of the improved pilot valve can be produced at appreciably less expense than the corresponding elements of the former types. Concomitantly, the increased dimensions of the passages facilitate flow of air therethrough reducing the time required to build up, or bleed off, pressure in the actuating chamber with a corresponding increase in the positiveness and the speed of action upon changes in the position of the actuating tappet.

It will further be observed that not only are the air passages having the relatively increased dimensions made possible by the invention less susceptible to obstruction by foreign particles entrained in the air stream but the movement of the wire member 33 within those passages under influence of the external tappet will have a tendency to dislodge and sweep such particles out of the passages, thereby preventing clogging of the same or progressive fouling when used with air containing oil or foreign solid or semi-solid matter.

Figure 3:
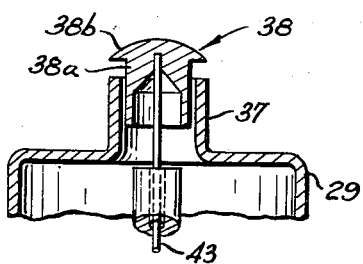
Figure 3 is a sectional view of a portion of an alternative form of the valve to which the invention is directed.

The alternative form of the invention shown in Figure 3 differs from that shown in Figures 1 and 2 only to the extent of a seating member in the form of a plug attached to the upper end of the auxiliary valve actuating wire replacing the extension of said wire for direct actuation by the baffle or tappet. Instead of the domed cylindrical cup 19 of Figures 1 and 2, with a centrally located small opening through which passes the wire 33, there is provided in the form shown in Figure 3 a domed member 29, identical in its lower cylindrical part with the member 19, but having in its top part a relatively large opening comprised in an extended cylindrical tubular portion 37 of an internal diameter of the order of, or somewhat greater than, the external diameter of the tubular member 30, and of appreciable axial length.

An auxiliary-valve-actuating wire 43, corresponding to the wire 33 in the previously described embodiment, extends centrally through the opening in the portion 37, and has secured thereto a plug member 38. Said plug member 38 comprises a cylindrical portion 38a and a seating portion or cap 38b. The cylindrical portion 38a fits loosely within the tubular portion 37 whereby to move freely therein in a longitudinal sense. The seating portion or cap 38b is made of extended diameter and is adapted to engage the top end of tubular portion 37 in sealing relationship when forced to its lowest position. Because the enlarged seating portion 38 by its positive engagement with the top of the tube 37 provides a positive stop against further downward displacement of the moving parts with which it is integral the wire 43 does not require to be provided with a kinked portion corresponding to the kink 36 in the wire 33 of Figures 1 and 2.

Operation of the form of the invention shown in Figure 3 is substantially identical to that of the previously described embodiment, the only essential difference being that instead of the obstruction to the escape of air from the cylinder above the piston 31 when the moving parts are in their depressed position being provided by baffle 35 in its engagement with the central opening at the top of the cap 19, as in the earlier form, closure is effected by the definite seating of the portion 38b upon the top of the tube 37.

The present invention has been described in connection with the type of pilot valve described and claimed in the copending application of E. F. Dyson, filed August 24, 1954, Serial No. 451,808, and assigned to the assignee of this application. While this invention as thus described is especially advantageous it may also be used to great advantage in providing other types of pilot valves as, for example, such pilot valves wherein a piston-valve is directly actuated by air pressure on one of its extremities in opposition to a force of a spring, or wherein a diaphragm-type actuating member is used.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A pilot valve for controlling the flow of a fluid from a pressure source to a motor element in response to variations in the flow of a relatively small volume of fluid from said source initiated by independent control means, comprising a body having an orifice formed therein communicating with the atmosphere, an inlet adapted to be coupled to said source and an outlet adapted to be coupled to said motor element, means for establishing communication between said inlet and said outlet in response to variations in the escape of fluid through said orifice and forming a variable-volume chamber with said body communicating with said orifice, said means including an elongated member having an axial bore formed therein communicating adjacent opposite ends thereof with said chamber and said inlet, an elongated stem member extending through said bore with one end portion thereof projecting through said orifice, said stem member being axially displaceable in said bore to a limited extent between two extreme positions, means on said stem member for interrupting the flow of said fluid through said bore when said stem member is in one of said extreme positions, said stem member being adapted to be displaced to the other of said positions by said independent control means, and said orifice being adapted to be obstructed by said independent control means when said stem member is in said other position.

2. A pilot valve for controlling the flow of a fluid from a pressure source to a motor element in response to variations in the flow of a relatively small volume of fluid from said source initiated by independent control means, comprising a body having an orifice formed therein communicating with the atmosphere, an inlet adapted to be coupled to said source and an outlet adapted to be coupled to said motor element, means for establishing communication between said inlet and said outlet in response to variations in the escape of fluid through said orifice and forming a variable-volume chamber with said body communicating with said orifice, said means including an elongated member having an axial bore formed therein communicating adjacent opposite ends thereof with said chamber and said inlet, an elongated stem member extending through said bore with one end portion thereof projecting through said orifice, said stem member being axially displaceable in said bore to a limited extent between two extreme positions, shiftable means for displacing said stem to one of said positions and for obstructing said orifice to thereby inhibit flow of fluid therethrough, and means on said stem for interrupting communication between said inlet and said chamber through said bore when said stem is in the other one of its said positions.

3. A pilot valve for controlling the flow of a fluid from a pressure source to a motor element in response to varaitions in the flow of a relatively small volume of fluid from said source initiated by independent control means, comprising a body having an orifice formed therein communicating with the atmosphere, an inlet adapted to be coupled to said source and an outlet adapted to be coupled to said motor element, means for establishing communication between said inlet and said outlet in response to variations in the escape of fluid through said orifice and including a movable member forming a variable-volume chamber with said body communicating with said orifice, said movable member having an elongated bore formed therethrough communicating adjacent opposite ends thereof with said chamber and said inlet, an elongated stem member extending through said bore toward said orifice and said inlet, said stem member being axially shiftable to a limited extent between two extreme positions, shiftable means for displacing said stem to one of said positions and for obstructing said orifice to thereby inhibit flow of fluid therethrough, and an auxiliary valve member fixed to said stem member and preventing communication between said inlet and said chamber through said bore when said stem is in the other one of its said positions.

4. A pilot valve for controlling the flow of a fluid from a pressure source to a motor element in response to variations in the flow of a relatively small volume of fluid from said source initiated by independent control means, comprising a body having an orifice formed therein communicating with the atmosphere, an inlet adapted to be coupled to said source and an outlet adapted to be coupled to said motor element, means for establishing communication between said inlet and said outlet in response to variations in the escape of fluid through said orifice and including a movable member forming a variable-volume chamber with said body communicating with said orifice, said movable member having an elongated bore formed therethrough communicating adjacent opposite ends thereof with said chamber and said inlet, an elongated stem member extending through said bore toward said orifice and said inlet, said stem member being axially shiftable to a limited extent between two extreme positions, said stem member having a kink formed therein adjacent one end for limiting displacement thereof in one direction to one of said positions, an auxiliary valve member fixed to said stem member and positioned to abut said movable member thereby to limit displacement of said stem member in the opposite direction and prevent communication between said inlet and said chamber through said bore, shiftable means for displacing said stem member to said one position and obstructing said orifice to inhibit the flow of fluid therethrough when said stem member is in said one position.

5. A pilot valve for controlling the flow of a fluid from a pressure source to a motor element in response to variations in the flow of a relatively small volume of fluid from said source initiated by independent control means, comprising a body having an orifice formed therein communicating with the atmosphere, an inlet adapted to be coupled to said source and an outlet adapted to be coupled to said motor element, means for establishing communication between said inlet and said outlet in response to variations in the escape of fluid through said orifice and including a movable member forming a variable-volume chamber with said body communicating with said orifice, said movable member having an elongated bore formed therethrough communicating adjacent opposite ends thereof with said chamber and said inlet, an elongated stem member extending through said bore and projecting therefrom toward said orifice and said inlet, said stem member being axially shiftable to a limited extent between two extreme positions, a plug member and an auxiliary valve member fixed to said stem member adjacent to opposite ends thereof, said plug member limiting the escape of fluid from said chamber through said orifice when said stem member is in one of its said positions, said auxiliary valve member preventing communication between said chamber and said inlet through said bore when said stem member is in the other one of its said positions, and said stem member being adapted to be displaced to said one position by said independent control means.

6. A pilot valve for controlling the flow of a fluid from a pressure source to a control element in response to variations in the flow of a relatively small volume of fluid initiated by independent control means, comprising a body having an inlet adapted to be coupled to said source and an outlet adapted to be coupled to said control element, said body having an interior passage providing communication between said source and said outlet, and including a seating surface, and having also an orifice providing communication between the interior thereof and the atmosphere, an extended translatable member within said body and comprising a tubular stem portion having adjacent one extremity a pressure responsive part adapted to respond to variations in pressure thereacross and forming within said body a variable-volume chamber communicating with said orifice, and adjacent to the other extremity a valve portion adapted in one of its positions to engage said seating surface in sealing relationship to prevent communication between said inlet and said outlet and in another of its positions to be free of said seating surface whereby to permit such communication, said tubular stem portion having a bore formed therethrough aligned with said orifice and the extremity thereof adjacent to said valve portion being conformed to constitute a second seating surface, an auxiliary valve member adapted to engage said second seating surface to prevent communication between said pressure source and the interior of said tubular member, a relatively slender stem part connected to said auxiliary valve member extending through the bore of said tubular member and in said orifice for actuating said auxiliary valve member, and shiftable means for actuating said stem part and said auxiliary valve member and obstructing said orifice to inhibit the flow of fluid therethrough when said auxiliary valve member is actuated.

7. A pilot valve for controlling the flow of a fluid from a pressure source to a control element in response to variations in the flow of a relatively small volume of fluid initiated by independent control means, comprising a body having an inlet adapted to be coupled to said source and an outlet adapted to be coupled to said control element, said body having an interior passage providing communication between said source and said outlet, and including a seating surface, and having also an orifice providing communication between the interior thereof and the atmosphere, an extended translatable member within said body and comprising a tubular stem portion having adjacent one extremity a pressure responsive part adapted to respond to variations in pressure thereacross and forming within said body a variable-volume chamber communicating with said orifice, and adjacent to the other extremity a valve portion adapted in one of its positions to engage said seating surface in sealing relationship to prevent communication between said inlet and said outlet and in another of its positions to be free of said seating surface whereby to permit such communication, said tubular stem portion having a bore formed therethrough aligned with said orifice and the extremity thereof adjacent to said valve portion being conformed to constitute a second seating surface, an auxiliary valve member adapted to engage said second seating surface to prevent communication between said pressure source and the interior of said tubular member, a relatively slender stem part connected to said auxiliary valve member extending through the bore of said tubular stem portion and free for limited axial movement relative to said tubular stem portion, said slender stem part projecting through said orifice, means on said slender stem part for limiting movement of said stem part when it is actuated to unseat said auxiliary valve member, and shiftable means for actuating said stem part and said auxiliary valve member and obstructing said orifice to inhibit the flow of fluid therethrough when said auxiliary valve member is actuated.

8. A pilot valve for controlling the flow of a fluid from a pressure source to a control element in response to variations in the flow of a relatively small volume of fluid initiated by independent control means, comprising a body having an inlet adapted to be coupled to said source and an outlet adapted to be coupled to said control element, said body having an interior passage providing communication between said source and said outlet, and including a seating surface, and having also an orifice providing communication between the interior thereof and the atmosphere, an extended translatable member within said body and comprising a tubular stem portion having adjacent one extremity a pressure responsive part adapted to respond to variations in pressure thereacross and forming within said body a variable-volume chamber communicating with said orifice, and adjacent to the other extremity a valve portion adapted in one of its positions to engage said seating surface in sealing relationship to prevent communication between said inlet and said outlet and in another of its positions to be free of said seating surface whereby to permit such communication, said tubular stem portion having a bore formed therethrough aligned with said orifice and the extremity thereof adjacent to said valve portion being conformed to constitute a second seating surface, an auxiliary valve member adapted to engage said second seating surface to prevent communication between said pressure source and the interior of said tubular member, a relatively slender stem part connected to said auxiliary valve member extending through the bore of said tubular stem portion and free for limited axial movement relative to said tubular stem portion, said slender stem part projecting through said orifice, said slender stem part having a kink formed therein intermediate said orifice and said tubular stem portion for abutting the latter thereby limiting movement of said slender stem part in one direction, and shiftable means for actuating said stem part and said auxiliary valve member and obstructing said orifice to inhibit the flow of fluid therethrough when said auxiliary valve member is actuated.

9. A pilot valve for controlling the flow of a fluid from a pressure source to a control element in response to variations in the flow of a relatively small volume of fluid initiated by independent control means, comprising a body having an inlet adapted to be coupled to said source and an outlet adapted to be coupled to said control element, said body having an interior passage providing communication between said source and said outlet, and including a seating surface, and having also an orifice providing communication between the interior thereof and the atmosphere, an extended translatable member within said body and comprising a tubular stem portion having adjacent one extremity a pressure responsive part adapted to respond to variations in pressure thereacross and forming within said body a variable-volume chamber communicating with said orifice, and adjacent to the other extremity a valve portion adapted in one of its positions to engage said seating surface in sealing relationship to prevent communication between said inlet and said outlet and in another of its positions to be free of said seating surface whereby to permit such communication, said tubular stem portion having a bore formed therethrough aligned with said orifice and the extremity thereof adjacent to said valve portion being conformed to constitute a second seating surface, an auxiliary valve member adapted to engage said second seating surface to prevent communication between said pressure source and the interior of said tubular member, a relatively slender stem part connected to said auxiliary valve member extending through the bore of said tubular stem portion and free for limited axial movement relative to said tubular stem portion, said slender stem part projecting through said orifice, and a plug member fixed to the portion of said slender stem part projecting through said orifice, said plug member being adapted to close said orifice and abut said body when said stem part is actuated to unseat said auxiliary valve member.

References Cited in the file of this patent

UNITED STATES PATENTS

| | | |
|---|---|---|
| 1,465,916 | Larner | Aug. 21, 1923 |
| 1,740,811 | Drake | Dec. 24, 1929 |
| 2,237,038 | Moore | Apr. 1, 1941 |
| 2,426,941 | Mercier | Sept. 2, 1947 |
| 2,607,367 | Mapes | Aug. 19, 1952 |
| 2,639,693 | Miller et al. | May 26, 1953 |